United States Patent [19]

Rowell

[11] Patent Number: 4,592,272
[45] Date of Patent: Jun. 3, 1986

[54] ASSEMBLER FOR ENCHILADA SHELLS

[75] Inventor: Lorne A. Rowell, Victoria, Canada

[73] Assignee: McCormick & Company, Incorporated, Hunt Valley, Md.

[21] Appl. No.: 763,690

[22] Filed: Aug. 8, 1985

Related U.S. Application Data

[62] Division of Ser. No. 488,984, Apr. 27, 1983, Pat. No. 4,533,559.

[51] Int. Cl.$^4$ .............................................. A47J 37/12
[52] U.S. Cl. ...................................... 99/353; 99/403; 99/427; 99/450
[58] Field of Search ............... 426/404, 439, 499, 502, 426/514; 425/363, 388, 391, 405 R; 99/403, 426, 427, 450.6, 450.7, 353, 450

[56] References Cited

U.S. PATENT DOCUMENTS

| | | | |
|---|---|---|---|
| 3,901,137 | 8/1975 | Jimenez | 99/353 |
| 3,928,638 | 7/1979 | Stickle | 426/439 |
| 4,160,043 | 12/1975 | Stickle et al. | 426/439 |
| 4,212,234 | 7/1980 | De Courcy | 426/514 |
| 4,275,647 | 6/1981 | Chambers et al. | 426/138 |
| 4,348,166 | 9/1982 | Fowler | 425/363 |

*Primary Examiner*—Billy J. Wilhite
*Attorney, Agent, or Firm*—Cushman, Darby & Cushman

[57] ABSTRACT

Flexible sheets of foodstuffs, such as a tortilla, are prepared for cooking by automatically wrapping each tortilla around a perforated inner cooking cylinder and telescoping an outer cooking cylinder over the so-wrapped inner cylinder. The wrapping and telescoping operations are carried out with the use of a carriage which rotates about a horizontal axis by feeding the inner cylinders to the carriage such that the cylinders are parallel to the axis of rotation and are carried in a circular path about that axis. At a feed station tortillas are fed sequentially in a generally radial direction into the path of the inner cylinders so that the outside of each cylinder contacts a surface of a tortilla. Vacuum is applied to the inside of each cylinder to hold the tortilla in place, and as the cylinder continues to move along its circular path it moves past a flexible guide arrangement which contacts the opposite surface of the tortilla and wraps it around the cylinder. Outer cooking cylinders are fed to the rotating carriage at a location axially spaced from the inner cylinders and in axial alignment therewith. Axial movement of each outer cylinder relative to the carriage and over a respective tortilla-wrapped inner cylinder results from engagement of one end of each outer cylinder with a fixed generally spiral cam which surrounds the appropriate part of the rotating carriage.

6 Claims, 6 Drawing Figures

ASSEMBLER FOR ENCHILADA SHELLS

This is a division of application Ser. No. 488,984 filed Apr. 27, 1983 now U.S. Pat. No. 4,533,559 issued Aug. 6, 1985.

This invention relates to an apparatus for wrapping flexible sheets of foodstuff, such as tortillas, between perforated inner and outer cooking cylinders as a step in the preparation of enchilada shells.

BACKGROUND OF THE INVENTION

Enchilada shell is the term used in this description for a round or oval tortilla which is rolled to form a cylinder and then fried in this shape in a suitable cooking oil until it is crisp and will retain its cylindrical shape.

The enchilada shell is a new product developed to eliminate the traditional stage of pan frying a flat tortilla in the preparation of an enchilada. In order to fry a tortilla in a cylindrical shape to make an enchilada shell, it was found preferably to wrap it around a perforated metal cylinder and then insert the resultant assembly into another perforated metal cylinder of larger diameter. In this manner the tortilla is held rolled beween the two cylinders during the frying operation. The perforations are required to permit good contact between the tortilla and the cooking oil and to facilitate the escape of moisture in the form of steam.

To carry out the assembly operation of the cylinders and tortilla by hand was found to be too labor intensive, inefficient and costly to be commercially viable. Thus there arose a need for an apparatus which would automatically assembly the tortilla and two cylinders for subsequent automatic feeding into a fryer and final automatic disassembly. With the automation of the assembly step, labor costs could be reduced and a food manufacturer would gain an economical means for putting to advantageous use the technique of frying enchilada shells encased in inner and outer cooking cylinders.

Accordingly, it is an object of the present invention to provide an apparatus for automatically effecting the assembly of a tortilla wrapped between an inner and outer cooking cylinders in the preparation of an enchilada shell.

It is another object of the present invention to provide such completed assemblies at a rate greater than that possible by manual methods of assembly.

SUMMARY OF THE INVENTION

In its broadest aspects the invention comprises feeding an inner perforated cooking cylinder to a carriage, applying a vacuum to the inside of the inner cooking cylinder, moving the carriage in a manner such that the cylinder moves in a direction transverse to its axis, contacting the outside of the cylinder with a surface of a flexible sheet of foodstuff, such as a tortilla, so that the vacuum holds the sheet to the cylinder, continuing to move the carriage past a guide arrangement which engages the opposite surface of the tortilla in a manner to wrap the tortilla completely around the cylinder and effecting relative telescopic movement between the wrapped cylinder and an outer perforated cylinder. In practice the technique is automatic and continuous in that inner cooking cylinders are fed successively to the carriage, which moves continuously, and assemblies of inner and outer cylinders with the foodstuff therebetween are continuously discharged from the carriage.

In a preferred form of apparatus for carrying out the method the carriage is rotatable about a horizontal axis, and the inner cooking cylinders are delivered to the carriage with their axes parallel to the axis of carrier rotation. The inner cylinders are thus moved along a circular path during rotation of the carriage. A fixed vacuum plenum is located axially adjacent one end of the carriage and is provided with an end plate having an arcuate slot concentric with the axis of rotation of the carriage. As the carriage rotates, the open ends of the inner cylinders (the opposite ends being partially closed) move sequentially into register with the slot with the result that a vacuum is applied to the interior of each inner cylinder during the period in which the inner cylinder remains in register with the slot. This occurs while the cylinders are near the top of their circular path.

A tortilla feeder sequentially feeds tortillas in a generally radial direction into the circular path taken by the inner cylinders as they move with the rotating carriage. Each tortilla intersects the path of a given inner cylinder while that cylinder is in register with the vacuum slot so that the internal vacuum in the cylinder holds one surface of the tortilla in contact with the outside of the cylinder. As the cylinder and the engaged tortilla continue to move with the carriage the opposite surface of the tortilla engages flexible guides which cause the tortilla to wrap around the cylinder. In so doing the guides are resiliently displaced and will return to their normal positions when the tortilla moves out of contact with them. The wrapping operation may be improved by rotating the cylinder about its axis at the same time as the guides are acting on the tortilla.

An outer cooking cylinder becomes telescoped over each inner wrapped cylinder after the above sequence. The outer cylinders are sequentially fed to the end portion of the carriage remote from the vacuum plenum in end-to-end alignment with the inner cylinders. A fixed generally spiral cam rail surrounds that part of the carriage which carries the outer cylinders, and during rotation of the carriage one end of each outer cylinder moves into engagement with the cam rail and is thereby forced in an axial direction toward a respective inner cylinder. The preferred shape of the cam rail causes each outer cylinder to telescope partially over the respective inner cylinder just before the inner cylinder is subjected to internal vacuum and then does not effect further telescopic movement of the outer cylinder until after the wrapping operation is carried out.

Discharge from the carriage of each telescoped pair of inner and outer cylinders with a tortilla therebetween is effected by gravity as the pair of cylinders arrives at a position at or near the bottom of its circular path.

DETAILED DESCRIPTION OF THE INVENTION

Figure 1:
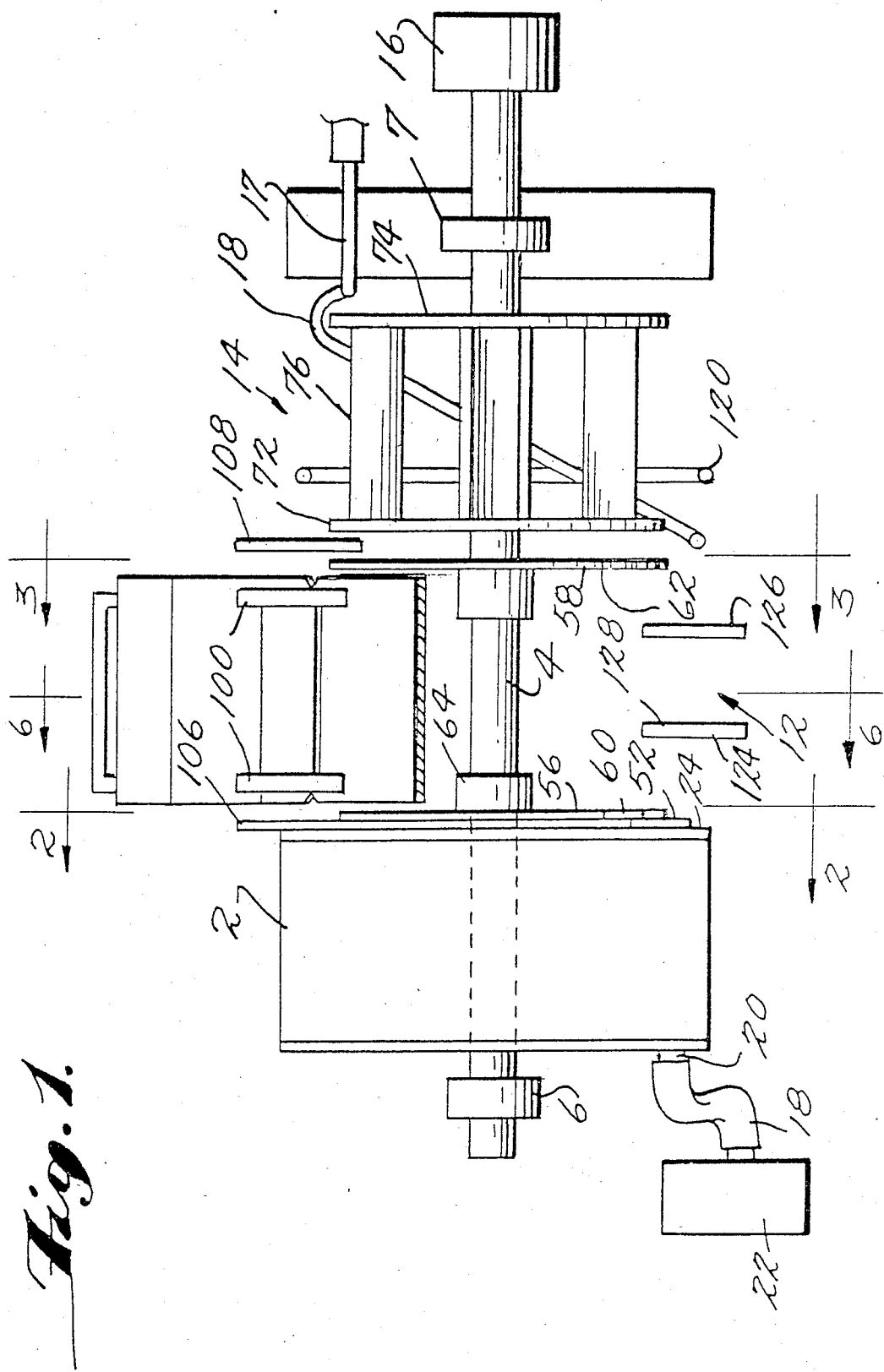
FIG. 1 is a schematic side view of a preferred embodiment of the present invention omitting features of the cylinder feeding devices for purposes of clarity.

Referring to FIG. 1, a preferred embodiment of the assembler for enchilada shells generally designated at 1 comprises a fixed plenum chamber 2, a horizontal rotatable shaft 4 which is supported by bearings 6 and 7 and which passes through plenum chamber 2, a carriage rotatable with the shaft 4 and motor means 16 for rotating the shaft 4 at constant speed. The carriage includes a first carriage turret generally designated at 12 for receiving inner cooking cylinders and a second carriage turret generally designated at 14 for receiving outer cooking cylinders. Surrounding the carriage turret 14 is a stationary, generally spiral cam rail 18 supported by a support arm 17. Connected to plenum chamber 2 by a vacuum hose 18 and a fixture 20 is a vacuum pump 22 for creating a negative air pressure of some 80 to 90 inches of water within the plenum chamber 2.

Figure 2:
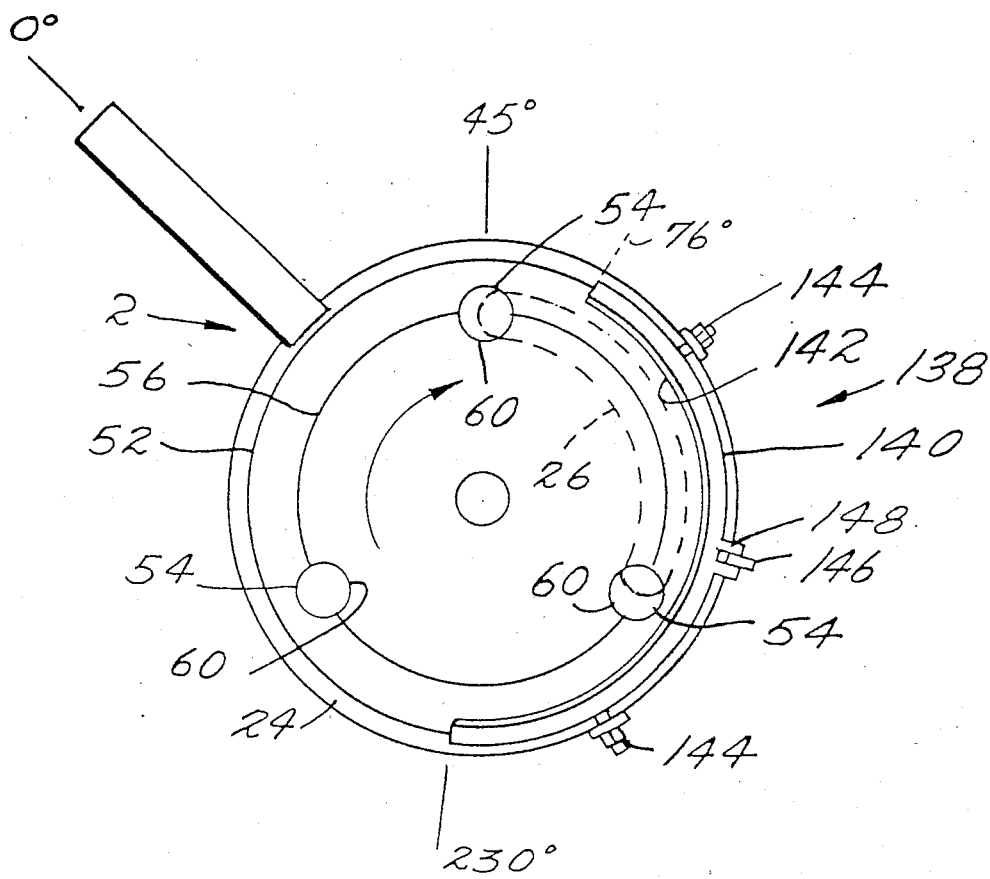
FIG. 2 is a schematic sectional view taken on line 2—2 in FIG. 1 showing the first and second disks of the first turret and the face of the plenum chamber of the preferred embodiment.

Referring to FIG. 2 it can be seen that the plenum chamber 2 has a circular end face 24 concentric to shaft 4 and an arcuate opening 26 in face 24. The shaft 4 rotates in the clockwise direction as viewed in FIG. 2.

Figure 3:
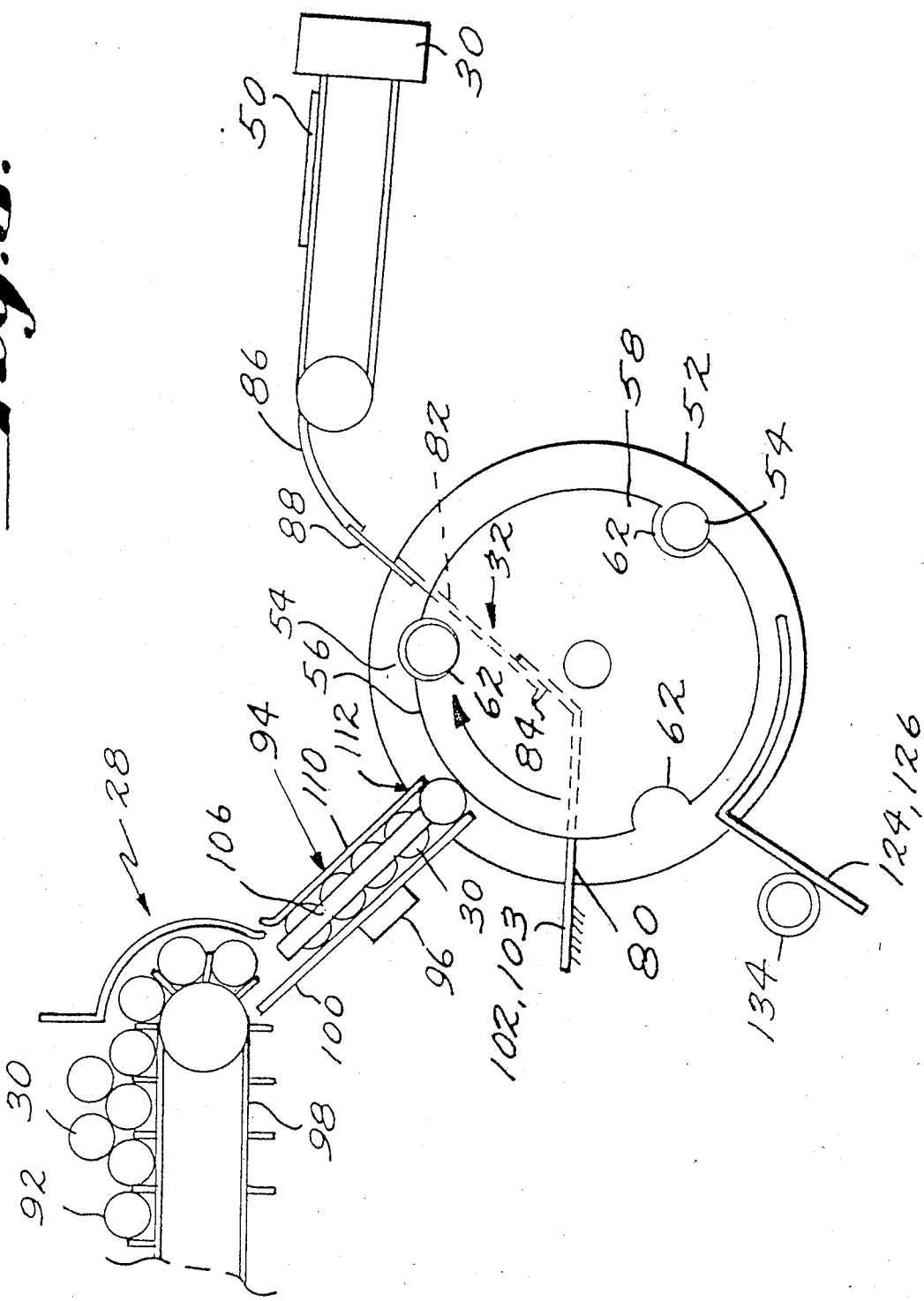
FIG. 3 is a schematic sectional view taken on line 3—3 in FIG. 1 and including the features of the feeder for the inner cylinders.
Figure 4:
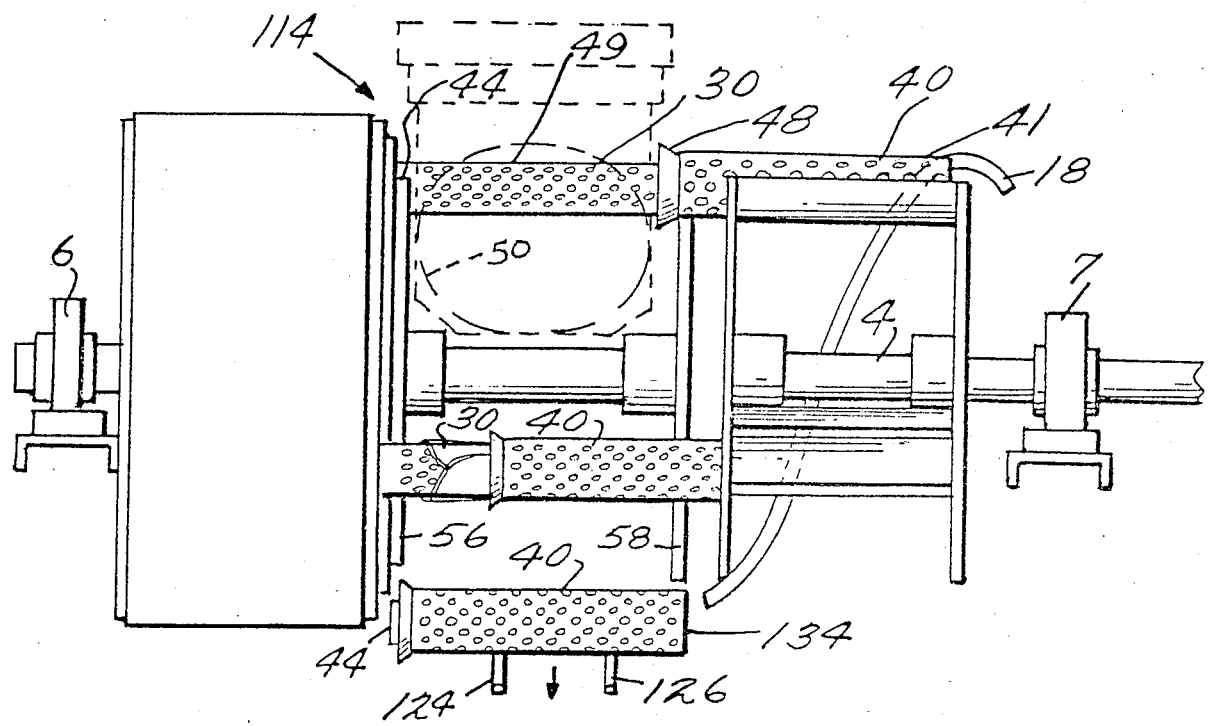
FIG. 4 is a schematic side view similar to FIG. 1 with the addition of several pairs of inner and outer cooking cylinders and tortillas being assembled.

Referring to FIGS. 3 and 4 the assembler 1 also comprises a first feeder generally designated at 28 for feeding successive inner cooking cylinders 30 onto the first carriage turret 12, and a tortilla loader generally designated at 32 which receives successive tortillas 50 from a conveyor 34 leading from a sequential tortilla feeder 36. The preferred embodiment also comprises a second feeder (not shown) which has features similar to first feeder 28 except that second feeder is sized to handle the larger outer cooking cylinders 40 and is positioned to feed them onto the second turret 14.

Each inner cooking cylinder 30 has an open end 44, a partially closed end 46 and a perforated wall 49. Each outer cooking cylinder 40 is of similar arrangement but of larger diameter with the addition of a flared end 48 which facilitates the process of urging it over an inner cooking cylinder 30. Opposite end 41 of the outer cooking cylnder 40 is open.

Referring to FIGS. 1 and 2, the first carriage turret 12 comprises a first end disk 52 having three, equally spaced apart circular apertures 54 which are in coincidental relationship with respect to the arcuate opening 26 of the face 24 of the plenum chamber 2 such that each aperture 54 will pass over the arc length of the arcuate opening 26 as the first disk 52 rotates with the shaft 4. Apertures 54 of the first disc are slightly smaller in diameter than the inner cooking cylinders 30. The disk 52 is preferably made of a self-lubricating material because of its substantial sliding contact with the face 24 of the fixed plenum chamber 2 during rotation.

The first carriage turret 12 also comprises a second disk 56 and third disk 58 which each have three equally spaced, semi-circular peripheral indentations 60 and 62, respectively, which are axially aligned and fixed with respect to the three circular apertures 54 of the first disk 52. The disk 56 of the first carriage turret 12 abuts the first disk 52 and the disks 56 and 58 are set apart along the rotatable shaft 4 a distance less than the length of the inner cooking cylinders 30. Preferably these disks as well as those of the second carriage turret 14 are keyed to shaft 4 and set by a set screw 64 in the usual manner.

Figure 5:
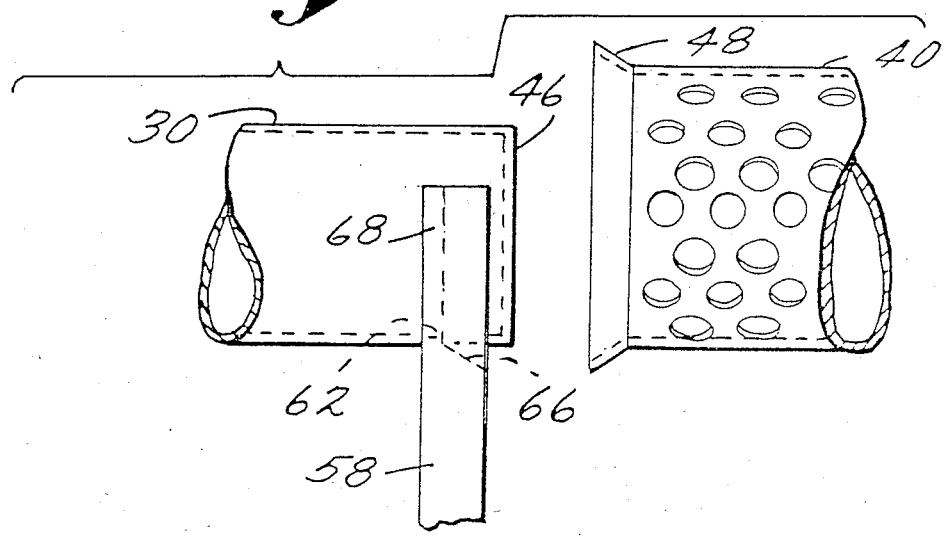
FIG. 5 is a schematic sectional view of the third disk of the first carriage turret showing one of the fluted indentations.

As is best viewed in FIG. 5, the indentations 62 of the third disk 58 have inclined edges 66 (disposed at 30° to the axis of the inner cylinder 30 when viewed in the FIG. 5 position) for contacting and favorably receiving the flared end 48 of an outer cooking cylinder 40 as the cylinder 40 is urged in an axial direction over the indentation 62. Also, the radius of the indentations 62 as determined by the semi-circular edge 68 is greater than the respective radius of the indentation 60 of the second disk 56. This arrangement allows the first carriage turret 12 to carry each inner cooking cylinder 30 in a normal relationship with respect to the first disk 52 once an outer cooking cylinder 40 has been urged over the partially closed end 46 of inner cooking cylinder 30.

The second carriage turret 14 comprises a fourth disk 72, a fifth disk 74 and three, mutually parallel trough members 76 extending from the fourth disk 72 to the fifth disk 74 at three equi-distant points about the respective peripheries of the disks 72 and 74. The trough members 76 are each of semi-circular cross-section of sufficient diameter to receive lengthwise an outer cooking cylinder 40 and each member 76 is concentrically in line with a respective pair of aligned indentations 60 and 62 of second and third disks 56 and 58.

The first feeder 28 for supplying successive inner cooking cylinders 30 to the first carriage turret 12 comprises a hopper 92 for containing a supply of inner cooking cylnders 30, an enclosed ramp generally designated at 94, a sensor 96 for automatically determining the presence of inner cooking cylinders 30 within enclosed ramp 94, a stop-start lug conveyor 98 for controlling the release of inner cooking cylinders 30 and which is governed by the sensor 96. When the detector 96 detects no cylinder 30 at the location of the detector 96, it starts the conveyor 98. If after a time delay of about 3 seconds there is still no cylinder 30 present, the assembler shaft 4 stops until sufficient cylinders arrive. The enclosed ramp 94 comprises twin rails 100 which are inclined and positioned to allow successive inner cooking cylinders to approach and come into contact with the peripheral edges 102 and 103 of the second and third disks 56 and 58 of the first carriage turret 12 at an angular station of 45° from the vertical. From henceforth, this location will be referred to as the 0° arc station and all other arc stations measured by angular displacement from same in the clockwise direction.

The twin rails 100 extend sufficiently to allow a respective inner cooking cylinder 30 which is about to be loaded onto the first carriage turret 12 to remain in contact with peripheral edges 102 and 103 of the disks 56 and 58, respectively, until the pair of aligned indentations 60 and 62 arrive at arc position 0° whereupon gravity forces the inner cooking cylinder 30 to roll onto and be retained by the indentations 60 and 62. The retaining walls 106 and 108 of the enclosed ramp 94 assure that the inner cooking cylinder 30 situates in indentations 60 and 62 such that the open end 44 just abuts the first disk 52. The partially open end 46 of the inner cooking cylinder 30 extends beyond the third disk 58. The enclosed ramp 94 also comprises a cover plate 110 connected by a hinge 112 which allows for the cover plate to be raised so that the inner cooking cylinders 30 can be accessed should jambing occur within the enclosed ramp 94.

It is to be understood that the second feeder is of similar arrangement as the first feeder 28 except for being scaled to handle the larger outer cooking cylinders 40 and being positioned such that it feeds successive outer cooking cylinders 40 into respective pocket members 76 of the second carriage turret 14 at arc station 0° and situates each outer cooking cylinder 40 such that its flared end 48 is just clear of the partially closed end 46 of the inner cooking cylinder 30. When so situated, the inner and outer cooking cylinders 30 and 40 are in end-to-end relationship. Delivery of the cooking cylinders 30 and 40 onto first and second carriage turrets 12 and 14, respectively, occurs essentially simultaneously.

The spiral cam rail 18 is situated to engage the end 41 of an outer cooking cylinder 40 as second carriage turret 14 rotates from arc station 0° to arc station 45° (vertical). This initial engagement urges the outer cooking cylinder 40 to translate along its axis until its flared end 48 passes over the partially closed end 46 of the inner cooking cylinder 30 to achieve an initial position at arc station 45° which is designated generally at 114 in FIG. 4. No further translation of the outer cooking cylinder 40 occurs until the wrapping process of the tortilla around the inner cylinder 30 has progressed sufficiently, about another 51° of angular displacement of the second carriage turret 14, as can be understood by referring to FIG. 4. It should be noted that flared end 48 of the outer cooking cylinder 40 has already slipped over a respective indentation 68 of the third disk 58 when in position 114.

Referring to FIGS. 1 and 3, the tortilla feeder 32, which is situated between second and third disks 56 and 58 of the first turret 12, comprises a support member 80 attached to an appropriate external support (not shown) a lower spring flap 82 and a stop 84. Also attached to suitable external support is a fixed slide 86 which in turn supports an upper spring flap 88. The lower free end of the upper flap 88 overlies the upper free end of the lower flap 82. Mylar sheet has been found to be a satisfactory material for both flaps. In the at-rest position as illustrated in FIG. 3, the upper flap 88 overlaps the lower flap 82 in order to allow tortillas 50 to slide from the slide 86 over the upper flap 88 on to the lower flap 82 thereover.

The tortilla feeder 36 receives tortillas in a single row from an oven or storage conveyor (not shown), spaces them and delivers them upon the conveyor 34 in timed sequence such that a released tortilla 50 arrives at the upper slide 86 at the proper time in the wrapping cycle. Upon leaving the slide 86 the tortilla continues over the upper and lower flaps 88 and 82 until it comes to stop 84 at which point it is properly prepositioned in the path of an oncoming inner cooking cylinder 30 being carried by the first carriage turret 12.

The tortilla feeder 36 can be made synchronous to the wrapping cycle by means of a controlling signal generated from an adjustable cam (not shown) fitted to shaft member 4 which operates a limit switch in feeder 36. This signal and switch arrangement actuates a final gate within the feeder 36 which releases a tortilla 50 so that it arrives at tortilla loader 32 at the proper time in the wrapping cycle of the assembler.

Figure 6:
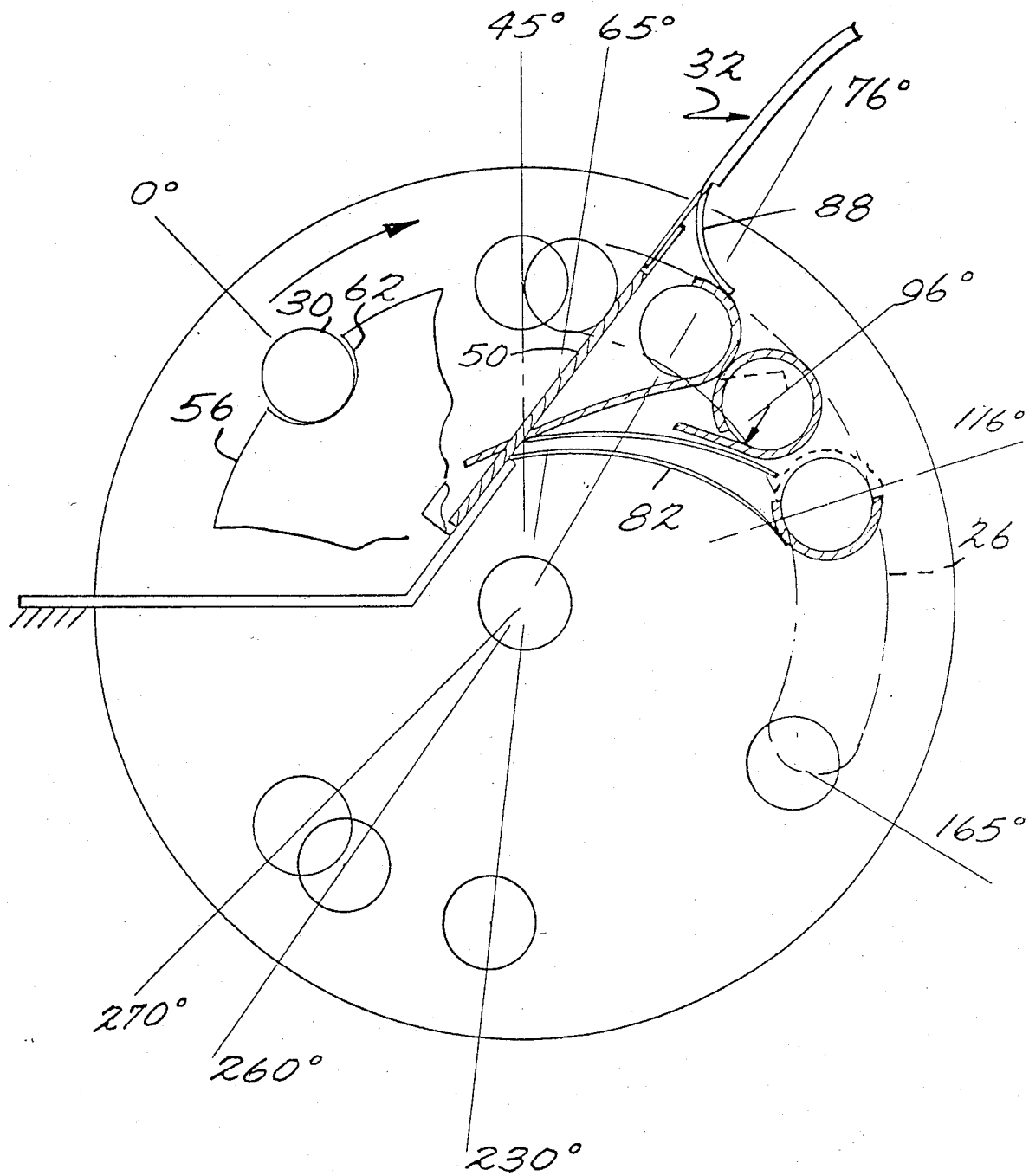
FIG. 6 is a schematic representation of the assembly process as viewed from line 6—6 in FIG. 1 but with certain features omitted for purposes of clarity.

Referring now to FIG. 6, it is to be understood that the tortilla loader 32 prepositions a tortilla 50 just beyond the physical bounds of an inner cooking cylinder 30 as the latter arrives at the arc station 65° whereat the respective aperture 54 of the first disk 52 also first comes into full coincidental alignment with the arcuate vacuum slot 26 of the plenum chamber 2 to thereby fully communicate the negative pressure of the plenum chamber 2 to the interior of the inner cooking cylinder 30 just as it begins contact with tortilla 50.

Upon the contact of the cylinder 30 with a tortilla 50, the wrapping process begins whereupon upper and lower flaps 88 and 82 cooperatively act to urge opposite body portions of the tortilla 50 against the perforated wall 49 of the cylinder 30 and whereupon the negative pressure within the cylinder 30 holds the so urged body portions of the tortilla 50 against the perforated wall 49 until the wrapping process has been completed and until an outer cooking cylinder 40 has been urged sufficiently over the so wrapped tortilla 50 that the latter will not be allowed to unravel. In the preferred embodiment a means 138 is also provided for rotating cooking cylinder 30 about its axis during the wrapping operations. The means comprise, as best shown in FIG. 2, a ring 140 having an inner lining 142 of material having a high coefficient of friction for bearing against the open end 44 of the inner cooking cylinder 30 as it is carried by the first carriage turret 12 from the arc station 76° to the arc station 230°. The ring 140 is suitably secured to the plenum chamber 2 by means of adjustable mounts 144 which allow for the positioning of the ring 140 to a more radially inwardly or more outwardly position to achieve the desired frictional effect. A stop bar 146 is rigidly secured to the plenum chamber 2 and stop bar catches 148 of the first ring 140 which engage the stop bar 146 at the arc station 153° relieve the adjustable mounts 144 of the angular thrust resulting from the frictional action on inner lining 142. The ring 140 is situated adjacent the first disk 52 and over the second disk 56 as is best viewed in FIG. 2 and has a thickness of approximately the same as second disk 56. Since the inner cooking cylinder 30 experiences greater friction with the inner lining 142 than with disks 56 and 58, the inner cooking cylinder 30 is caused to rotate about its axis counterclockwise as viewed in FIG. 2. The advantages of this rotation during the wrapping process will be apparent even for soft tortillas, although they might be wrapped satisfactorily without this feature. A rack and pinion arrangement could be used for the rotation of inner cylinders 30 instead of the method described but it will be appreciated that such an arrangement would be more costly when one realizes the number of pinions which would be involved.

Referring to FIG. 1, the assembler 1 also comprises a retaining ring 120 which is held stationary by appropriate connection to an external support (not shown) in a position set apart from but concentric to the second carriage turret 14. The retainer rings 120 and 122 should begin at least by arc station 65° and are provided to prevent the outer cooking cylinders 40 from falling out of the respective pocket-members 76 as the outer cooking cylinders 40 are carried beyond arc station 65°. It is to be understood that the cam rail 18 passes between the second carriage turret 14 and retainer rings 120 and 122.

Referring to FIGS. 1 and 3, there are also provided paired guideways 124 and 126 which are held stationary by appropriate connection to an external support (not shown). The guideways 124 and 126 have an arced section 128 and 130 respectively which are radially spaced from and generally concentric with the first carriage turret 12 to prevent telescoped pairs of inner and outer cooking cylinders 30 and 40 from falling off the first carriage turret 12 beyond arc station 165°. Between arc station 65° and arc station 165°, the inner cooking cylinders 30 are retained by the first ring 140 and the flared end 48 of a respective outer cooking cylinder 40. At arc station 270°, guideways 124 and 126 form a ramp leading away from the first carriage turret 12 for allowing a final assembled unit 134 to fall from the first carriage turret 12 and to roll away as seen in FIGS. 3 and 4.

Further description of the assembly operation may be had with reference to FIG. 6 and to the Table provided below which lists the steps involved in chronological order and with reference to the pertinent arc station (0° arc station being the point of delivery of the inner and outer cooking cylinders 30 and 40 to the first and second carriage turrets 12 and 14, respectively, it being recalled that 0° arc station is 45° from the vertical). It is noted that only those elements of assembler 1 connected with the shaft 4 rotate. The cam rail 18, the retainer rings 120 and 122, the guideways 124 and 126, the first ring 142, the feeders 28 and 38, the plenum chamber 2 and the tortilla loader 32 are among elements which do not rotate.

TABLE

| Arc Station (Degrees) | Function |
| --- | --- |
| 0 | Inner cooking cylinder 30 and outer cooking cylinder 40 drop onto first carriage turret 12 and second carriage turret 14, respectively, these turrets rotating at constant speed clockwise as viewed in FIGS. 3 and 6. |
| 0-45 | Outer cooking cylinder 40 is moved over partially closed end 46 of inner cooking cylinder 30 by cam rail 18 to position 114 shown in FIG. 4. |
| 45 | Inner cooking cylinder 30 is under partial negative pressure |
| 65 | Inner cooking cylinder 30 is under full suction and contacts tortilla 50. |
| 65-76 | Inner cooking cylinder 30 pushes tortilla 50 against spring flaps 82 and 88 causing them to deflect as shown in FIG. 6. |
| 76 | (a) The negative pressure differential across perforated wall 49 of inner cooking cylinder 30 holds tortilla 50 against it as shown in FIG. 6 and upper spring flap 88 is released to snap back to its original at rest position. (b) Inner cooking cylinder 30 commences to rotate about its axis. |
| 96 | Cam rail 18 recommences moving outer cooking cylinder 40 laterally along its axis over inner cooking cylinder 30 and tortilla 50. |
| 116 | (a) Lower spring flap 82 is released and snaps back to its orignal at rest position under upper spring flap 88. (b) A new tortilla 50 slides into place toward stop 84 to replace the original tortilla 50 which has been removed. |
| 165 | The negative pressure differential is being released from inner cooking cylinder 30, however the outer cooking cylinder 40 has now passed the mid point of inner cooking cylinder 30 and has the tortilla |

TABLE-continued

| Arc Station (Degrees) | Function |
| --- | --- |
| | well contained between the two cooking cylinders 30 and 40. |
| 230 | Inner cooking cylinder 30 ceases to rotate about its axis. |
| 260 | Outer cooking cylinder 40 reaches the end of its axial movement. |
| 270 | The final assembled unit 134 is discharged from the assembler (see FIG. 4). |

As mentioned previously, the cam rail 18 causes each outer cooking cylinder to undergo an initial axial displacement to a position 114 over the partially open end 46 of an inner cooking cylinder 30 as it travels from 0° to 45° arc stations. No further lateral movement of the outer cooking cylinder 40 occurs between 45° and 96° arc stations, but thereafter the cam rail 18 recommences the movement of the outer cooking cylinder 40 over the inner cooking cylinder 30 and the tortilla 50 at a uniform rate until the flared end 48 of the outer cooking cylinder 40 reaches the end of its translation in the proximity of the second disk 56. This movement is completed by the 260° arc station. It will be appreciated that two separate cam rails could be used for the two stage movement caused by the cam rail 18.

The release of the final assembled unit 134 is achieved at the 270° arc station whereat the final assembled unit 134 is allowed under force of gravity to exit from the first carriage turret 12. The final assembled unit 134 is then directed towards the next staging area for further processing of the encased tortilla 50.

It is to be understood that the embodiment herein illustrated and discussed is by way of illustration and not of limitation, and that other embodiments may be made without departing from the spirit or scope of this invention.

What is claimed is:

1. Apparatus for successively wrapping flattened foodstuff material between sets of inner and outer cooking cylinders comprising:
   first means for carrying a series of individual inner cylinders in parallel spaced apart relationship with one another, said inner cylinders having perforated walls,
   means for delivering successive individual inner cylinders to said first carrying means,
   second means for carrying a series of individual outer cylinders in parallel, spaced apart relationship with one another and in coincidental, end to end relationship with respective individual inner cylinders being carried on said first carrying means,
   means for delivering successive individual outer cylinders to said second carrying means,
   means for applying a negative pressure differential within said inner cylinders as said inner cylinders is carried along a first path segment by said first carrying means,
   means for successively placing an individual said flattened stuff material in said first path segment of said inner cylinders while said inner cylinders is in said first path segment,
   guide means for wrappingly urging said placed individual flattened food stuff material against said perforated walls of said individual inner cylinders as said inner cylinders continues along said first path, means for urging a respective individual said outer cylinders over a respective individual said inner cylinders as said foodstuff material is circumferentially wrapped about said inner cylinders, and means for successively releasing the resultant assembly from said apparatus.

2. An apparatus for successively wrapping flattened foodstuff material in between sets of inner and outer cooking cylinders each having at least one open end and said inner cylinders having perforated walls comprising:

a stationary plenum chamber for containing a negative pressure differential, said chamber having a circular surface area and a concentrical annular opening into said chamber through said circular surface area, a shaft member concentrically rotatable with respect to said circular area, a first disc member concentrically abutted to said circular area and secured to said shaft member, said first disc member having a first number of spaced apart apertures radially coincidental to said annular opening of said plenum chamber, said apertures providing for the communication of said negative pressure differential of said plenum chamber through said first disc member when said annular opening and at least one said aperture are in coincidence, a second disc member secured to said shaft member in close proximity to said first disc member, said second disc member having a first number of spaced apart indentations in the peripheral edge thereof, each said indentations being coincidental with respect to one each of said apertures of said first disc member, a third disc member secured to said shaft member and having a first number of spaced apart indentations in the peripheral edge thereof, each said indentations being coincidental with respect to one each of said indentations of said first disc, each respective pair of coincidental indentations from said second and third disc being apart a distance less than the length of said inner mandrels, a turret element longitudinally secured to said shaft member in spaced apart proximity to said third disc, said turret element having a first number of longitudinally disposed pockets, one each of said pockets being coincidentally inline with one of said pairs of coincidental indentations of said second and third disc, means for rotationally driving said shaft member, means for successively delivering individual inner cooking cylinders onto said pairs of coincidental indentations of said second and third discs with said open end of said inner cooking cylinders in close proximity to the respective said aperture of said first disc, said delivery occuring at a first annular station, means for simultaneously delivering at said first annular station an individual outer cooking cylinder onto a respective said pocket of said drum element with said open end of said individual outer cooking cylinder in end-to-end proximity to a respective said proximate, delivered individual inner cooking cylinder, first means for urging said individual outer cooking cylinder partially over the proximate end of said individual inner cylinder, resilient flap means for initially holding flattened food stuff material in the path of said individual inner cooking cylinder at a point annularly beyond where said aperture of said first disc has communicated said negative pressure of said plenum chamber through said first disc and into said individual inner cooking cylinder, said resilient flap means further urging said flattened foodstuff material about said individual inner cooking cylinder as said inner cooking cylinder continues along said annular path under said negative pressure as communicated by said apertures of said first disc member, means for repetitively delivering an individual flattened foodstuff material to said resilient flap means, second means for urging said individual outer cooking cylinder over said inner cooking cylinder as said foodstuff material has circumferentially wrapped about said individual inner cooking cylinder, and means for releasing the said coupled individual inner and outer cooking cylinders from said apparatus.

3. An appratus as claimed in claim 1 wherein said outer cooking cylinder has an open end which is flared to facilitate its being urged over said inner cooking cylinder and foodstuff material.

4. An apparatus as claimed in claim 1 wherein said outer cooking cylinder has perforated walls.

5. An apparatus as claimed in claim 1 wherein said apparatus also provides for a means for successively rotating each said individual inner cooking cylinder about its axis as said inner cooking cylinder is subjected to said negative pressure differential to facilitate the wrapping of said foodstuff material about said inner cooking cylinder.

6. An apparatus as claimed in claim 1 wherein said means for placing said foodstuff material and said guide means for urging said foodstuff material are the same.

* * * * *